(12) United States Patent
Oda et al.

(10) Patent No.: US 10,193,126 B2
(45) Date of Patent: Jan. 29, 2019

(54) BATTERY TERMINAL, METHOD FOR MANUFACTURING BATTERY TERMINAL, AND BATTERY

(71) Applicants: NEOMAX MATERIALS CO., LTD., Suita-shi, Osaka (JP); HITACHI METALS, LTD., Minato-ku, Tokyo (JP); AOYAMA SEISAKUSHO IBARAKI PLANT CO,. LTD., Hitachinaka, Ibaraki (JP)

(72) Inventors: Yoshimitsu Oda, Suita (JP); Masaharu Yamamoto, Suita (JP); Masaaki Ishio, Tokyo (JP); Naonori Ishii, Hitachinaka (JP); Hirofumi Nakano, Hitachinaka (JP)

(73) Assignees: HITACHI METALS, LTD., Tokyo (JP); AOYAMA SEISAKUSHO IBARAKI PLANT CO., LTD., Ibaraki (JP)

( * ) Notice: Subject to any disclaimer, the term of this patent is extended or adjusted under 35 U.S.C. 154(b) by 637 days.

(21) Appl. No.: 14/921,344

(22) Filed: Oct. 23, 2015

(65) Prior Publication Data
US 2016/0118641 A1    Apr. 28, 2016

(30) Foreign Application Priority Data

Oct. 24, 2014 (JP) ................................ 2014-217060
Aug. 27, 2015 (JP) ................................ 2015-167523

(51) Int. Cl.
*H01M 2/30* (2006.01)
*H01M 10/0525* (2010.01)

(52) U.S. Cl.
CPC .......... *H01M 2/30* (2013.01); *H01M 10/0525* (2013.01)

(58) Field of Classification Search
CPC .. H01M 10/0525; H01M 2/30; H01M 2/1061; H01M 2/20
See application file for complete search history.

(56) References Cited

U.S. PATENT DOCUMENTS 8,673,479 B2    3/2014  Byun et al.
9,627,676 B2    4/2017  Oda et al.
(Continued)

FOREIGN PATENT DOCUMENTS

JP    2001-176495 A    6/2001
JP    5481827 B2       4/2014
(Continued)

OTHER PUBLICATIONS

Chinese Office Action dated Sep. 13, 2017, issued in Chinese Patent Application No. 201510696231.5, with translation.
(Continued)

*Primary Examiner* — Basia A Ridley
*Assistant Examiner* — Heng M. Chan
(74) *Attorney, Agent, or Firm* — Westerman, Hattori, Daniels & Adrian, LLP

(57) ABSTRACT

A battery terminal includes a shaft portion and a flange portion. The battery terminal is made of a clad material in which at least a first metal layer and a second metal layer are bonded to each other. Each of the shaft portion and the flange portion includes the first metal layer on a first side in a shaft direction and the second metal layer on a second side in the shaft direction. The first metal layer in the shaft portion includes a protruding portion that further protrudes to the second side in the shaft direction with respect to a surface of the first metal layer on the second side in the shaft direction in the flange portion.

20 Claims, 7 Drawing Sheets

(56) References Cited

U.S. PATENT DOCUMENTS

| | | | |
|---|---|---|---|
| 2012/0058390 A1 | 3/2012 | Obayashi et al. | |
| 2014/0011074 A1* | 1/2014 | Oda ........................ | H01M 2/30 |
| | | | 429/160 |

FOREIGN PATENT DOCUMENTS

| | | |
|---|---|---|
| JP | 5426594 B2 | 2/2015 |
| KR | 2011-0103612 A | 9/2011 |
| KR | 2012-0024503 A | 3/2012 |
| KR | 2014-0004687 A | 1/2014 |
| WO | WO-2012133654 A1 * 10/2012 .............. H01M 2/30 |

OTHER PUBLICATIONS

Office Action dated Nov. 24, 2017, issued in Korean Patent Application No. 10-2015-0148293, with translation.

Office Action dated May 30, 2018, issued in counterpart Chinese Application No. 201510696231.5, with English translation. (10 pages).

* cited by examiner

MODIFICATION OF FIRST EMBODIMENT

MODIFICATION OF SECOND EMBODIMENT

BATTERY TERMINAL, METHOD FOR MANUFACTURING BATTERY TERMINAL, AND BATTERY

CROSS-REFERENCE TO RELATED APPLICATION

The priority application numbers JP2014-217060, Battery Terminal and Method for Manufacturing Battery Terminal, Oct. 24, 2014, Yoshimitsu Oda et al. and JP2015-167523, Battery Terminal, Method for Manufacturing Battery Terminal, and Battery, Aug. 27, 2015, Yoshimitsu Oda et al., upon which this patent application is based, are hereby incorporated by reference.

BACKGROUND OF THE INVENTION

Field of the Invention

The present invention relates to a battery terminal applicable to a lithium-ion battery, for example, a method for manufacturing the terminal battery, and a battery employing the battery terminal, and more particularly, it relates to a battery terminal including different metal layers, a method for manufacturing the battery terminal, and a battery employing the battery terminal.

Description of the Background Art

A battery terminal including different metal layers is known in general, as disclosed in Japanese Patent No. 5426594, for example.

Japanese Patent No. 5426594 discloses a negative electrode rivet (battery terminal) including a head part made of Cu to which a current collecting plate made of Cu is bonded and a tail part made of Al to which a bus bar made of Al is bonded. This negative electrode rivet is integrated (bonded) by friction stir welding of a shaft part of the head part and the tail part that face each other. Japanese Patent No. 5426594 also discloses a negative electrode rivet (battery terminal) further including a bond portion arranged between a shaft part of a head part and a tail part and made of clad metal in which a Cu layer and an Al layer are pressure-bonded to each other, as another example. This negative electrode rivet according to another example is integrated (bonded) by laser welding of the head part made of Cu and the Cu layer of the clad metal and laser welding of the tail part made of Al and the Al layer of the clad metal.

In the negative electrode rivet disclosed in Japanese Patent No. 5426594, however, a large amount of heat is generated on an interface (bond portion) between the head part and the tail part due to friction or laser light when the head part made of Cu and the tail part made of Al are bonded to each other by friction stir welding or laser welding, and hence the interface reaches a high temperature. In this case, the heat reaches the interface between the copper of the head part and the aluminum of the tail part, and a fragile intermetallic compound is generated. Thus, bonding strength between the head part and the tail part is disadvantageously likely to be reduced.

SUMMARY OF THE INVENTION

The present invention has been proposed in order to solve the aforementioned problem of a battery terminal including different metal layers, and an object of the present invention is to provide a battery terminal, a method for manufacturing the battery terminal, and a battery employing the battery terminal each capable of increasing bonding strength between different metal layers.

A battery terminal according to a first aspect of the present invention includes a shaft portion and a flange portion that radially expands in a radiation direction from the shaft portion and is made of a clad material in which at least a first metal layer and a second metal layer are bonded to each other. Each of the shaft portion and the flange portion includes the first metal layer on a first side in the shaft direction of the shaft portion and the second metal layer on a second side in the shaft direction of the shaft portion, and the first metal layer in the shaft portion includes a protruding portion that further protrudes to the second side in the shaft direction with respect to a surface of the first metal layer on the second side in the shaft direction in the flange portion.

As hereinabove described, the battery terminal according to the first aspect of the present invention is made of the clad material, whereby no heat causing excessive growth of an intermetallic compound may be applied when the battery terminal is prepared, and hence a reduction in bonding strength between the first metal layer and the second metal layer can be prevented, as compared with the case where the first metal layer and the second metal layer are bonded to each other by friction stir welding or laser welding. Furthermore, the first metal layer of the shaft portion includes the protruding portion that further protrudes to the second side in the shaft direction with respect to the surface of the first metal layer on the second side in the shaft direction in the flange portion, whereby the area of an interface between the first metal layer and the second metal layer can be increased due to the protruding portion. Thus, the bonding strength between the first metal layer and the second metal layer can be increased.

Furthermore, in the battery terminal according to the first aspect of the present invention, as hereinabove described, each of the shaft portion and the flange portion includes the first metal layer on the first side in the shaft direction of the shaft portion and the second metal layer on the second side in the shaft direction of the shaft portion. Thus, the first metal layer on the first side in the shaft direction of the shaft portion can be easily bonded to one of a connecting member that connects batteries to each other and a collector of a battery, and the second metal layer on the second side in the shaft direction of the shaft portion can be easily bonded to the other of the connecting member and the collector. Consequently, the connecting member and the collector can be easily electrically connected to each other through the battery terminal. In this case, if the connecting member is made of metal different from metal of which the collector is made, the first metal layer and one of the connecting member and the collector are made of the same type of metal while the second metal layer and the other of the connecting member and the collector are made of the same type of metal. Thus, the connecting member and the collector can be electrically connected to each other through the battery terminal while tight bonding is ensured due to bonding of the same types of metal.

In the aforementioned battery terminal according to the first aspect, at least in a central portion of the shaft portion, the protruding portion of the first metal layer preferably protrudes to the second side in the shaft direction with respect to the surface of the first metal layer on the second side in the shaft direction in the flange portion. According to this structure, the area of the interface between the first metal layer and the second metal layer can be increased in the central portion of the shaft portion in the vicinity of the center of the battery terminal, and hence the bonding strength between the first metal layer and the second metal layer can be effectively increased.

In this case, in the central portion of the shaft portion, the protruding portion of the first metal layer preferably includes a convex portion that protrudes in a convex shape to the second side in the shaft direction. According to this structure, the area of the interface between the first metal layer and the second metal layer can be reliably increased due to the convex portion, and hence the bonding strength between the first metal layer and the second metal layer can be reliably increased.

In the aforementioned structure in which the protruding portion includes the convex portion, in the shaft center of the shaft portion, the convex portion preferably protrudes to the second side in the shaft direction with respect to a surface of the flange portion on the second side in the shaft direction. According to this structure, the area of the interface between the first metal layer and the second metal layer can be increased as compared with the case where the convex portion does not further protrude to the second side in the shaft direction with respect to the surface of the flange portion on the second side in the shaft direction, and hence the bonding strength between the first metal layer and the second metal layer can be increased. Furthermore, in the shaft portion, the interface (an end of the convex portion on the second side in the shaft direction) between the first metal layer and the second metal layer can be separated by a large distance from the first side in the shaft direction to which the first metal layer is exposed when the first metal layer and the connecting member or the collector are bonded to each other in the shaft portion. Thus, the interface between the first metal layer and the second metal layer in the shaft portion is separated by a large distance from a bond portion between the exposed first metal layer and the connecting member or the collector, and hence heat resulting from bonding (welding) of the bond portion can be inhibited from reaching the interface. Consequently, generation of the fragile intermetallic compound in the interface between the first metal layer and the second metal layer can be suppressed, and hence a reduction in the bonding strength between the first metal layer and the second metal layer can be suppressed.

In the aforementioned structure in which the convex portion further protrudes to the second side with respect to the surface of the flange portion on the second side, in the shaft center, the convex portion preferably protrudes longer than the length of the flange portion in the shaft direction to the second side in the shaft direction beyond the surface of the flange portion on the second side in the shaft direction. According to this structure, the convex portion can be made relatively large, and hence the area of the interface between the first metal layer and the second metal layer can be increased.

In the aforementioned battery terminal according to the first aspect, one of the first metal layer and the second metal layer is preferably made of Al or an Al alloy (Al-base alloy), and the other of the first metal layer and the second metal layer is preferably made of Cu or a Cu alloy (Cu-base alloy). According to this structure, when the first metal layer of the battery terminal on the first side in the shaft direction is made of the same type of metal (Al-based alloy or Cu-based alloy) as one of the connecting member and the collector and the second metal layer of the battery terminal on the second side in the shaft direction is made of the same type of metal (Cu-based alloy or Al-based alloy) as the other of the connecting member and the collector, the connecting member, the battery terminal, and the collector can be electrically connected to each other while the same are tightly bonded to each other by the same types of metal. Furthermore, the Al-based alloy and the Cu-based alloy each have relatively large ductility and are deformable, and hence the convex portion can be easily formed in the first metal layer while fracture or the like is suppressed, as compared with one of the first metal layer and the second metal layer has relatively small ductility and is not deformable.

In the aforementioned battery terminal according to the first aspect, in the shaft direction, the minimum length of the first metal layer of the flange portion is preferably at least 30% of the length of the flange portion. According to this structure, the first metal layer can be sufficiently ensured in the shaft direction in the flange portion, and hence the heat resulting from bonding (welding) of the first metal layer and the connecting member or the collector can be inhibited from reaching the interface between the first metal layer and the second metal layer when the first metal layer of the battery terminal exposed to the first side in the shaft direction and the connecting member or the collector are bonded to each other.

In the aforementioned structure in which the protruding portion includes the convex portion, in the shaft center of the shaft portion, a length from a surface of the flange portion on the second side in the shaft direction to an end of the convex portion on the second side in the shaft direction is preferably not more than 80% of the length of the shaft portion. According to this structure, the length of the second metal layer in the shaft direction can be easily ensured on the second side in the shaft direction of the shaft portion. Consequently, the length of the second metal layer in the shaft direction is ensured so that the second metal layer and the connecting member or the collector can be easily bonded to each other when the second metal layer on the second side in the shaft direction of the shaft portion and the connecting member or the collector are bonded to each other. Furthermore, the length of the second metal layer in the shaft direction is ensured, whereby the interface (the end of the convex portion on the second side in the shaft direction) between the first metal layer and the second metal layer can be separated by a large distance from an end on the second side in the shaft direction to which the second metal layer is exposed when an end of the shaft portion on the second side in the shaft direction and the connecting member or the collector are bonded to each other. Thus, the interface between the first metal layer and the second metal layer is separated by a large distance from a bond portion between the second metal layer and the connecting member or the collector, and hence heat resulting from bonding (welding) of the bond portion can be inhibited from reaching the interface. Consequently, generation of the fragile intermetallic compound in the interface between the first metal layer and the second metal layer can be suppressed, and hence a reduction in the bonding strength between the first metal layer and the second metal layer can be suppressed.

In the aforementioned battery terminal according to the first aspect, an end of the shaft portion on the second side in the shaft direction is preferably formed with a bottomed hole in which a bottom surface and an inner side surface include the second metal layer. According to this structure, the battery terminal and the connecting member or the collector can be easily fixed to each other by fixing in a state where the connecting member or the collector is inserted into the bottomed hole or deforming and swaging the second metal layer around the bottomed hole, for example, when the battery terminal and the connecting member or the collector are fixed to each other.

In the aforementioned battery terminal according to the first aspect, both the first metal layer and the second metal layer are preferably substantially axisymmetric with respect to the shaft center of the shaft portion. According to this structure, the battery terminal having a relatively simple shape can be easily formed.

The aforementioned battery terminal according to the first aspect preferably further includes a reaction suppression layer configured to suppress reaction of metal of which the first metal layer is made and metal of which the second metal layer is made. According to this structure, the reaction suppression layer can reliably suppress generation of the fragile intermetallic compound caused by the reaction of the metal of which the first metal layer is made and the metal of which the second metal layer is made, and hence a reduction in the bonding strength between the first metal layer and the second metal layer resulting from the intermetallic compound can be reliably suppressed.

In the aforementioned structure in which the protruding portion of the first metal layer protrudes in the central portion of the shaft portion, in the protruding portion of the first metal layer, an outside portion outside the central portion preferably further protrudes to the second side in the shaft direction with respect to the central portion. According to this structure, the bonding strength between the first metal layer and the second metal layer in a position where the outside portion is formed can be effectively increased.

In this case, the outside portion preferably annularly protrudes to the second side in the shaft direction. According to this structure, the outside portion that annularly protrudes can effectively suppress sliding of the interface between the first metal layer and the second metal layer in a direction orthogonal to the shaft direction.

In the aforementioned structure in which the outside portion annularly protrudes to the second side in the shaft direction, the outside portion preferably annularly protrudes so as to be tapered toward the second side in the shaft direction. According to this structure, both improvement of the bonding strength and suppression of the sliding can be easily ensured without complicating the shape of the outside portion.

A method for manufacturing a battery terminal according to a second aspect of the present invention includes forming an overlay clad material by bonding at least a first metal layer and a second metal layer to each other and forming a battery terminal including a shaft portion and a flange portion that radially expands in a radiation direction from the shaft portion by performing extrusion processing on the overlay clad material. Each of the shaft portion and the flange portion includes the first metal layer on a first side in the shaft direction of the shaft portion and the second metal layer on a second side in the shaft direction of the shaft portion, and the first metal layer in the shaft portion includes a protruding portion that further protrudes to the second side in the shaft direction with respect to a surface of the first metal layer on the second side in the shaft direction in the flange portion.

In the method for manufacturing the battery terminal according to the second aspect of the present invention, the extrusion processing involving relatively simple positioning is performed on the overlay clad material, whereby the battery terminal in which the protruding portion is formed in the first metal layer of the shaft portion can be easily prepared, in addition to the aforementioned effects according to the first aspect.

In the aforementioned method for manufacturing a battery terminal according to the second aspect, forming the overlay clad material preferably includes bonding a reaction suppression layer configured to suppress reaction of metal of which the first metal layer is made and metal of which the second metal layer is made between the first metal layer and the second metal layer. According to this structure, the reaction suppression layer can reliably suppress generation of a fragile intermetallic compound caused by the reaction of the metal of which the first metal layer is made and the metal of which the second metal layer is made, and hence a reduction in the bonding strength between the first metal layer and the second metal layer resulting from the intermetallic compound can be reliably suppressed.

A battery according to a third aspect of the present invention includes a battery terminal including a shaft portion and a flange portion that radially expands in a radiation direction from the shaft portion. The battery terminal is made of a clad material in which at least a first metal layer and a second metal layer are bonded to each other, each of the shaft portion and the flange portion includes the first metal layer on a first side in the shaft direction of the shaft portion and the second metal layer on a second side in the shaft direction of the shaft portion, and the first metal layer in the shaft portion includes a protruding portion that further protrudes to the second side in the shaft direction with respect to a surface of the first metal layer on the second side in the shaft direction in the flange portion.

In the battery according to the third aspect of the present invention, a connecting member that connects batteries to each other and a collector of a battery made of metal different from metal of which the connecting member is made can be easily bonded to each other by the battery terminal according to the aforementioned first aspect in which the different metal layers are bonded to each other.

In the aforementioned battery according to the third aspect, at least in a central portion of the shaft portion, the protruding portion of the first metal layer of the battery terminal preferably protrudes to the second side in the shaft direction with respect to the surface of the first metal layer on the second side in the shaft direction in the flange portion. According to this structure, the area of an interface between the first metal layer and the second metal layer can be increased in the central portion of the shaft portion in the vicinity of the center of the battery terminal, and hence bonding strength between the first metal layer and the second metal layer in the battery terminal can be effectively increased.

In this case, in the central portion of the shaft portion, the protruding portion of the first metal layer of the battery terminal preferably includes a convex portion that protrudes in a convex shape to the second side in the shaft direction. According to this structure, the area of the interface between the first metal layer and the second metal layer can be reliably increased due to the convex portion in the battery terminal, and hence the bonding strength between the first metal layer and the second metal layer can be reliably increased.

In the aforementioned battery according to the third aspect, the first metal layer of the battery terminal is preferably connected to one of a connecting member and a collector made of the same type of metal as the first metal layer, and the second metal layer of the battery terminal is preferably connected to the other of the connecting member and the collector made of the same type of metal as the second metal layer. According to this structure, the connecting member and the collector can be electrically connected to each other through the battery terminal while tight bonding is ensured due to bonding of the same types of metal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of an assembled battery 100 according to a first embodiment of the present invention is now described with reference to FIGS. 1 to 5.

Figure 1:
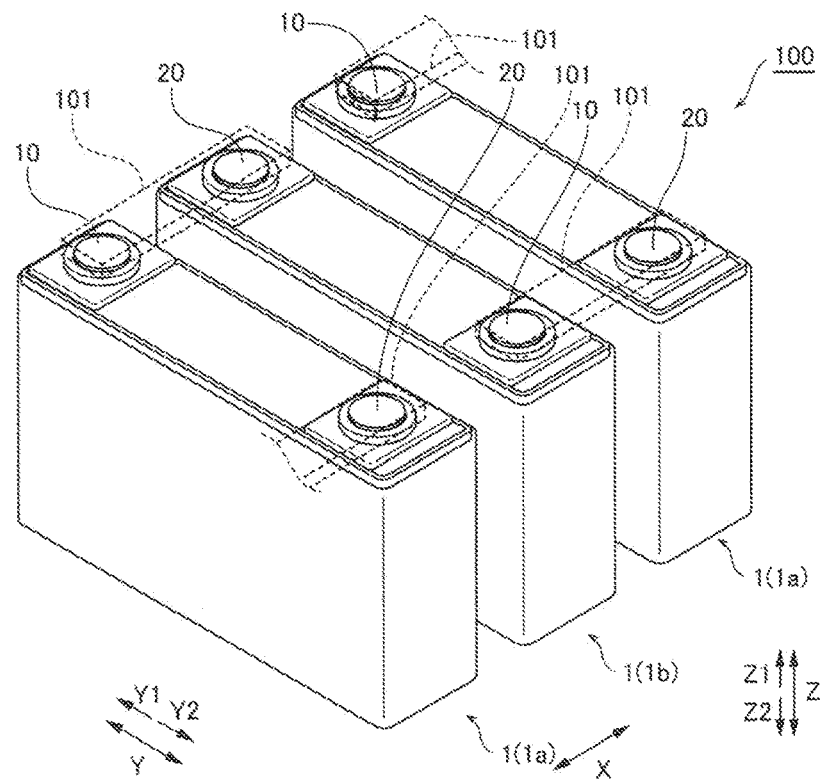
FIG. 1 is a perspective view showing an assembled battery according to a first embodiment of the present invention.

The assembled battery 100 according to the first embodiment of the present invention is a large-sized battery system employed in an electric vehicle (EV), a hybrid electric vehicle (HEV), a residential electric storage system, etc. This assembled battery 100 includes a plurality of lithium-ion batteries 1 electrically connected to each other by a plurality of flat plate-shaped bus bars 101 (shown by dotted lines), as shown in FIG. 1. The bus bars 101 are examples of the "connecting member" in the present invention.

In the assembled battery 100, the plurality of lithium-ion batteries 1 are aligned along the narrow width direction (direction X) of the lithium-ion batteries 1 in a plan view. Furthermore, in the assembled battery 100, lithium-ion batteries 1 (1a) in which positive-electrode terminals 10 are located on a first side (Y1 side) in a wide width direction (direction Y) orthogonal to the narrow width direction while negative-electrode terminals 20 are located on a second side (Y2 side) in the direction Y and lithium-ion batteries 1 (1b) in which positive-electrode terminals 10 are located on the Y2 side while negative-electrode terminals 20 are located on the Y1 side are alternately arranged along the direction X.

Positive-electrode terminals 10 of prescribed lithium-ion batteries 1 are welded (bonded) to first ends in the direction X of the bus bars 101 of Al that extends in the direction X. Negative-electrode terminals 20 of lithium-ion batteries 1 adjacent to the prescribed lithium-ion batteries 1 are welded to second ends in the direction X of the bus bars 101 of Al. Thus, the positive-electrode terminals 10 of the lithium-ion batteries 1 are connected to the negative-electrode terminals 20 of the lithium-ion batteries 1 adjacent thereto through the bus bars 101. In this manner, the assembled battery 100 in which the plurality of lithium-ion batteries 1 are connected in series to each other is configured. The bus bars 101 of Al are employed, whereby the weight of the bus bars 101 can be reduced so that the weight of the entire assembled battery 100 employing the plurality of bus bars 101 can be reduced, as compared with the case where bus bars of Cu are employed. Al represents so-called pure aluminum in No. A1000s of JIS (Japanese Industrial Standards), and Cu represents so-called pure copper such as an oxygen-free copper, tough pitch copper, and phosphorus-deoxidized copper.

Figure 2:
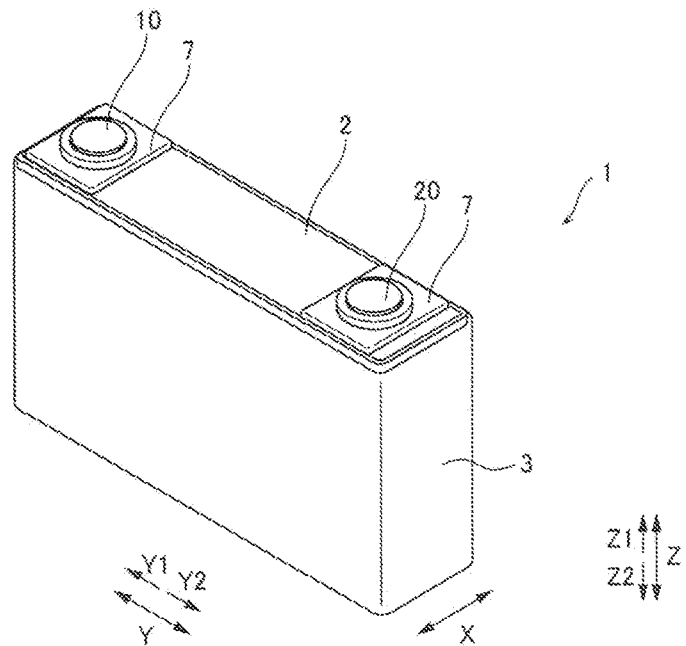
FIG. 2 is a perspective view showing the overall structure of a lithium-ion battery according to the first embodiment of the present invention.

Each of the lithium-ion batteries 1 has a substantially rectangular parallelepiped outer shape, as shown in FIG. 2. Each of the lithium-ion batteries 1 includes a cover member 2 arranged on a first side (upper side; Z1 side) in a vertical direction (direction Z) orthogonal to the direction X and the direction Y and a battery case body 3 arranged on a second side (lower side; Z2 side) in the vertical direction. These cover member 2 and battery case body 3 each are made of a Ni-plated steel sheet.

Figure 3:
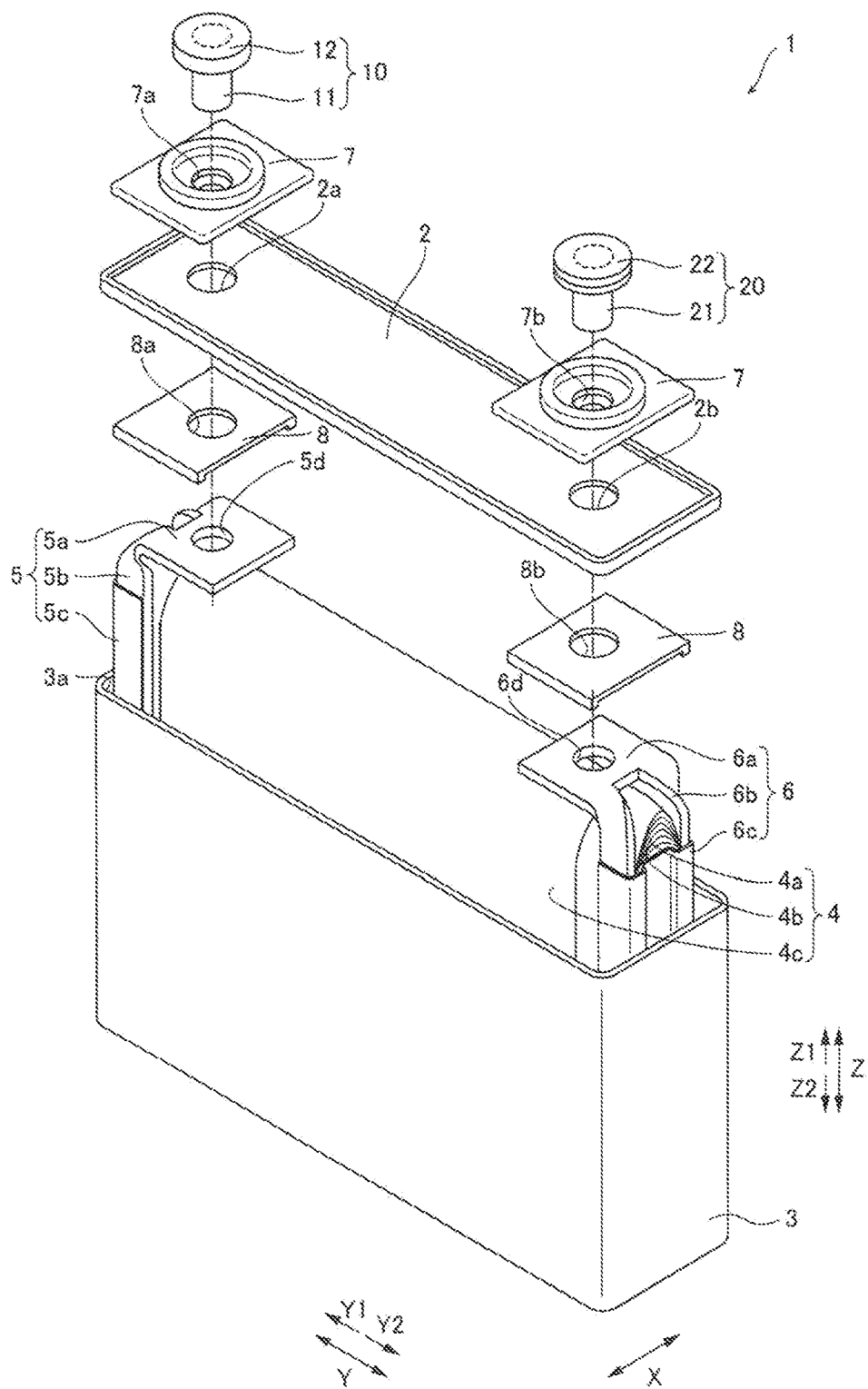
FIG. 3 is an exploded perspective view showing the overall structure of the lithium-ion battery according to the first embodiment of the present invention.

The cover member 2 is flat plate-shaped, as shown in FIG. 3. The cover member 2 is provided with a pair of insertion holes 2a and 2b that pass therethrough in the direction Z. The pair of insertion holes 2a and 2b are provided at a prescribed interval in the direction Y of the cover member 2 and are provided in a substantially central portion in the direction X of the cover member 2. Furthermore, a positive-electrode terminal 10 and a negative-electrode terminal 20 are inserted into the pair of insertion holes 2a and 2b, respectively.

Each of the lithium-ion batteries 1 includes a power generation element 4 in which a positive electrode 4a, a negative electrode 4b, and a separator 4c are stacked in a roll shape and an unshown electrolyte. The positive electrode 4a is made of Al foil to which a positive-electrode active material is applied. The negative electrode 4b is made of Cu foil to which a negative-electrode active material is applied. The separator 4c has a function of isolating the positive electrode 4a and the negative electrode 4b from each other.

Each of the lithium-ion batteries 1 includes a positive-electrode collector 5 that electrically connects the positive-electrode terminal 10 to the positive electrode 4a of the power generation element 4 and a negative-electrode collector 6 that electrically connects the negative-electrode terminal 20 to the negative electrode 4b of the power generation element 4. The positive-electrode collector 5 is arranged on the Y1 side in correspondence to the positive-electrode terminal 10. The positive-electrode collector 5 includes a connecting portion 5a provided with a hole 5d into which the positive-electrode terminal 10 is inserted, a leg portion 5b that extends to the Z2 side, and a connecting plate 5c that connects the leg portion 5b to the positive electrode 4a. The positive-electrode collector 5 is made of Al, similarly to the positive electrode 4a.

The negative-electrode collector 6 is arranged on the Y2 side in correspondence to the negative-electrode terminal 20. The negative-electrode collector 6 includes a connecting portion 6a provided with a hole 6d into which the negative-electrode terminal 20 is inserted, a leg portion 6b that extends to the Z2 side, and a connecting plate 6c that connects the leg portion 6b to the negative electrode 4b. The negative-electrode collector 6 is made of Cu, similarly to the negative electrode 4b.

The positive-electrode terminal 10 includes a columnar shaft portion 11 that extends in the direction Z and an annular flange portion 12 that radially expands in an X-Y planar direction from the shaft portion 11 in an end of the shaft portion 11 on the Z1 side and around the end. Consequently, the positive-electrode terminal 10 is rivet-shaped and has a T-shaped cross-section along the direction Z.

The rivet-shaped positive-electrode terminal 10 is made of Al, similarly to the positive-electrode collector 5 and the bus bars 101. In this positive-electrode terminal 10, an unshown Al plate is extruded, whereby the shaft portion 11 and the flange portion 12 are integrated.

An insulating packing 7 is arranged between the flange portion 12 of the positive-electrode terminal 10 and the cover member 2, and an insulating packing 8 is arranged between the cover member 2 and the connecting portion 5a of the positive-electrode collector 5. The packings 7 and 8 include insertion holes 7a and 8a into which the shaft portion 11 of the positive-electrode terminal 10 is inserted, respectively. The flange portion 12 of the positive-electrode terminal 10 is arranged above the cover member 2 to be arranged outside a lithium-ion battery 1. On the other hand, a portion of the shaft portion 11 that further protrudes to the Z2 side with respect to the flange portion 12 is arranged in the insertion holes 7a, 2a, and 8a and inside the lithium-ion battery 1 (battery case body 3).

Figure 4:
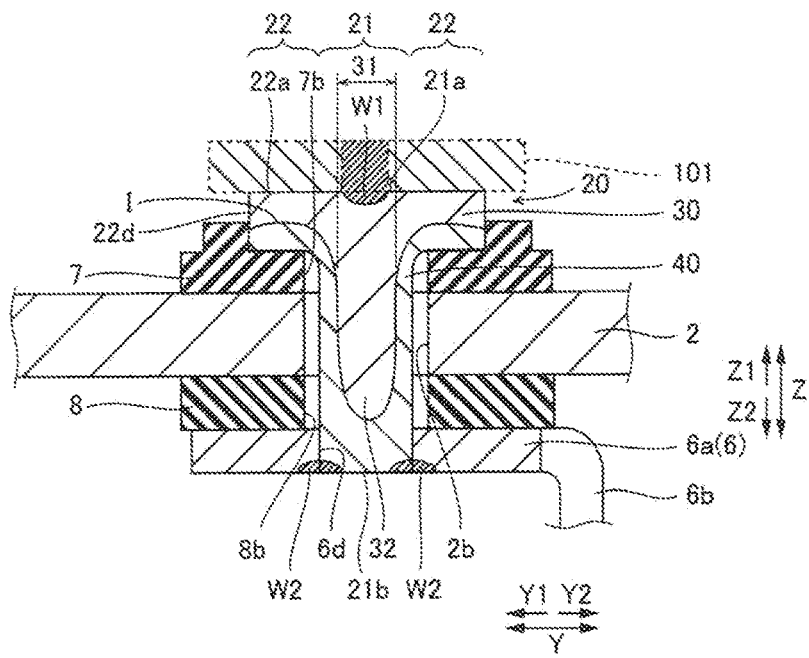
FIG. 4 is a sectional view showing a region around a negative-electrode terminal of the lithium-ion battery according to the first embodiment of the present invention.
Figure 5:
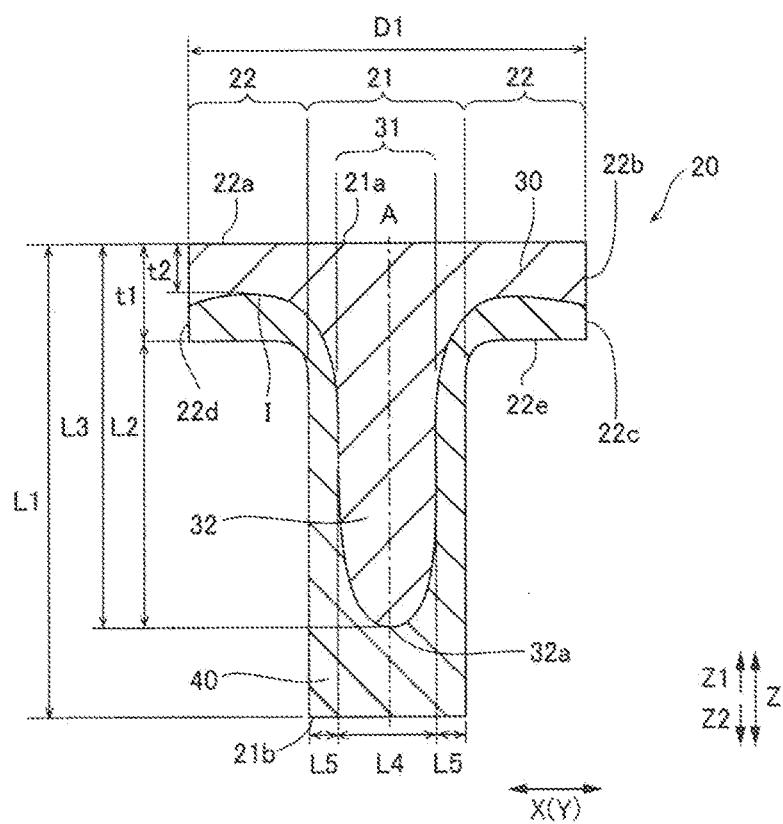
FIG. 5 is a sectional view showing the negative-electrode terminal of the lithium-ion battery according to the first embodiment of the present invention.

The negative-electrode terminal 20 has an outer shape similar to that of the positive-electrode terminal 10. In other words, the negative-electrode terminal 20 includes a columnar shaft portion 21 that extends in the direction Z and an annular flange portion 22 that radially expands in the X-Y planar direction from the shaft portion 21 in an end of the shaft portion 21 on the Z1 side and around the end. Consequently, the negative-electrode terminal 20 is rivet-shaped and has a T-shaped cross-section along the direction Z, as shown in FIGS. 4 and 5. The shaft portion 21 is located in a substantially central portion of the negative-electrode terminal 20 in the direction X and the direction Y. The negative-electrode terminal 20 is an example of the "battery terminal" in the present invention. The direction Z is an example of the "shaft direction" in the present invention, the Z1 side is an example of the "first side in the shaft direction" in the present invention, and the X-Y planar direction is an example of the "radiation direction" in the present invention.

In the negative-electrode terminal 20, extrusion described later is performed, whereby the shaft portion 21 and the flange portion 22 are integrated. As shown in FIG. 5, the negative-electrode terminal 20 has a diameter D1 of about 10 mm in the direction X and the direction Y and a length L1 of about 12 mm in the direction Z. The flange portion 22 has a thickness t1 of about 2 mm in the direction Z. The Z2 side is an example of the "second side in the shaft direction" in the present invention.

According to the first embodiment, the negative-electrode terminal 20 is made of a clad material in which a first metal layer 30 of Al that has relatively large ductility and is deformable and a second metal layer 40 of Cu that has relatively large ductility and is deformable are bonded to each other by rolling, as shown in FIGS. 4 and 5. The first metal layer 30 and the second metal layer 40 bonded to each other by rolling are tightly bonded to each other on an interface I therebetween. On the cross-section of the negative-electrode terminal 20 along the direction Z (Z2 side), the first metal layer 30 is arranged in upper portions of the shaft portion 21 and the flange portion 22, and hence the first metal layer 30 is exposed to the upper surface 21a of the shaft portion 21, the upper surface 22a of the flange portion 22, and an upper side surface 22b (a side surface 22d of an upper portion of the flange portion 22) on the Z1 side of the negative-electrode terminal 20.

According to the first embodiment, a convex portion 32 that protrudes to the Z2 side in the direction Z (shaft direction) is provided in a central portion 31 of the first metal layer 30 of the shaft portion 21. In other words, the first metal layer 30 of the shaft portion 21 includes a protruding portion (convex portion 32) that protrudes to the Z2 side in the direction Z in the central portion 31 of the shaft portion 21. An end 32a of the convex portion 32 of the shaft portion 21 on the Z2 side is tapered.

In the shaft center A of the shaft portion 21, the convex portion 32 protrudes longer than the length (thickness t1) of the flange portion 22 in the direction Z to the Z2 side beyond the lower surface 22e of the flange portion 22 on the Z2 side. In other words, the convex portion 32 of the first metal layer 30 in the shaft portion 21 further protrudes to the Z2 side with respect to a surface (interface I) of the first metal layer 30 on the Z2 side in the flange portion 22. On the other hand, the negative-electrode terminal 20 is formed such that in the shaft center A, a length L2 from the lower surface 22e of the flange portion 22 on the Z2 side to the end 32a of the convex portion 32 on the Z2 side is not more than 80% of the length L1 of the shaft portion 21 (negative-electrode terminal 20). Furthermore, the negative-electrode terminal 20 is formed such that in the shaft center A, the maximum length L3 of the first metal layer 30 in the direction Z in the shaft portion 21 is not more than about 90% of the length L1 of the negative-electrode terminal 20 in the direction Z. The length L3 is preferably not more than about 80% of the length L1 and is more preferably not more than about 70% of the length L1.

The second metal layer 40 is arranged to cover the first metal layer 30 from the Z2 side, and hence the second metal layer 40 is exposed to the Z2 side of the shaft portion 21 and a lower side surface 22c (a side surface 22d of a lower portion of the flange portion 22) of the flange portion 22. Consequently, the convex portion 32 is formed so as not to be exposed to the outside of the negative-electrode terminal 20, and hence the first metal layer 30 is formed so as not to be exposed to the Z2 sides of the shaft portion 21 and the flange portion 22.

In the annular flange portion 22, the first metal layer 30 and the second metal layer 40 are bonded to each other in the direction Z on an entire surface on which the first metal layer 30 and the second metal layer 40 face each other. In other words, in the flange portion 22, overlay clad bonding is performed. Consequently, the interface I between the first metal layer 30 and the second metal layer 40 is exposed to the side surface 22d of the flange portion 22 not a side surface of the shaft portion 21. Thus, the interface I is not arranged inside the lithium-ion battery 1, and hence the electrolyte or the like inside the lithium-ion battery 1 can be inhibited from reaching the interface I. Consequently, a reduction in bonding strength between the first metal layer 30 and the second metal layer 40 caused by the electrolyte or the like inside the lithium-ion battery 1 can be suppressed.

Both the first metal layer 30 and the second metal layer 40 are substantially axisymmetric with respect to the shaft center A.

In the flange portion 22, the minimum thickness t2 of the first metal layer 30 in the direction Z is at least about 30% of the thickness t1 of the flange portion 22 in the direction Z. The minimum thickness t2 represents a thickness from an uppermost end face of the interface I between the first metal layer 30 and the second metal layer 40 to the upper surface 22a.

On the cross-section of the shaft portion 21 along the direction Z, the length (width) L4 of the convex portion 32 of the first metal layer 30 along the direction X and the direction Y orthogonal to the direction Z is larger than the length L5 of the second metal layer 40 formed around the convex portion 32 along the direction X and the direction Y. The length L4 is preferably at least twice the length L5. The length L4 and the length L5 represent the length of the first metal layer 30 and the length of the second metal layer 40 in a position where the lengths of the first metal layer 30 in the direction X and the direction Y in the shaft portion 21 are maximized.

As shown in FIG. 4, a bus bar 101 is laser-welded to a substantially central portion of the upper surface 21a (a surface on the Z1 side) of the shaft portion 21, whereby a weld portion W1 is formed in the substantially central portion of the upper surface 21a of the shaft portion 21. The outer periphery of a lower end (top surface) 21b of the shaft portion 21 and the connecting portion 6a of the negative-electrode collector 6 are laser-welded to each other, whereby a weld portion W2 is formed in the end 21b of the shaft portion 21 and around the end 21b.

Similarly to the positive-electrode terminal 10, an insulating packing 7 is arranged between the flange portion 22 of the negative-electrode terminal 20 and the cover member 2, and an insulating packing 8 is arranged between the cover member 2 and the connecting portion 6a of the negative-electrode collector 6. The packings 7 and 8 include insertion holes 7b and 8b into which the shaft portion 21 of the negative-electrode terminal 20 is inserted, respectively. The flange portion 22 of the negative-electrode terminal 20 is arranged above the cover member 2 to be arranged outside the lithium-ion battery 1. On the other hand, a portion of the shaft portion 21 that further protrudes to the Z2 side with respect to the flange portion 22 is arranged in the insertion holes 7b, 2b, and 8b and inside the lithium-ion battery 1 (battery case body 3).

According to the first embodiment, the following effects can be obtained.

According to the first embodiment, as hereinabove described, the negative-electrode terminal 20 is made of the clad material, whereby the first metal layer 30 and the second metal layer 40 are tightly bonded to each other on the interface I. Thus, a reduction in the bonding strength can be prevented, as compared with the case where the first metal layer 30 and the second metal layer 40 are bonded to each other by friction stir welding or laser welding easily causing generation of an intermetallic compound due to heat. Furthermore, the protruding portion (convex portion 32) that further protrudes to the Z2 side in the direction Z (shaft direction) with respect to the surface (interface I) of the first metal layer 30 on the Z2 side in the flange portion 22 is provided in the first metal layer 30 of the shaft portion 21, whereby the area of the interface I can be increased due to the convex portion 32. Thus, the bonding strength between the first metal layer 30 and the second metal layer 40 can be increased.

According to the first embodiment, the protruding portion (convex portion 32) that protrudes to the Z2 side is provided in the central portion 31 of the shaft portion 21, whereby the area of the interface I between the first metal layer 30 and the second metal layer 40 can be increased in the central portion 31 of the shaft portion 21 in the vicinity of the center of the negative-electrode terminal 20. Thus, the bonding strength between the first metal layer 30 and the second metal layer 40 can be effectively increased.

According to the first embodiment, the central portion 31 of the first metal layer 30 of the shaft portion 21 includes the convex portion 32 that protrudes to the Z2 side, whereby the area of the interface I can be reliably increased due to the convex portion 32. Thus, the bonding strength between the first metal layer 30 and the second metal layer 40 can be reliably increased.

According to the first embodiment, the Z1 side of each of the shaft portion 21 and the flange portion 22 includes the first metal layer 30, and the Z2 side of each of the shaft portion 21 and the flange portion 22 includes the second metal layer 40. Thus, the first metal layer 30 exposed to the Z1 side of the negative-electrode terminal 20 and the bus bar 101 that connects the lithium-ion batteries 1 to each other can be easily bonded to each other, and the second metal layer 40 exposed to the Z2 side of the negative-electrode terminal 20 and the negative-electrode collector 6 of the lithium-ion battery 1 can be easily bonded to each other. Consequently, the bus bar 101 and the negative-electrode collector 6 can be easily electrically connected to each other through the negative-electrode terminal 20. Furthermore, the first metal layer 30 is made of the same metal (Al) as the bus bar 101, and the second metal layer 40 is made of the same metal (Cu) as the negative-electrode collector 6, whereby the bus bar 101 and the negative-electrode collector 6 can be electrically connected to each other through the negative-electrode terminal 20 while tight bonding is ensured due to bonding of the same metals.

According to the first embodiment, in the shaft center A of the shaft portion 21, the convex portion 32 further protrudes to the Z2 side with respect to the lower surface 22e of the flange portion 22 on the Z2 side, whereby the area of the interface I between the first metal layer 30 and the second metal layer 40 can be increased as compared with the case where the convex portion 32 does not further protrude to the Z2 side with respect to the lower surface 22e. Thus, the bonding strength between the first metal layer 30 and the second metal layer 40 can be increased. Furthermore, in the shaft portion 21, the interface I between the first metal layer 30 and the second metal layer 40 can be separated by a large distance from the upper surface 21a of the negative-electrode terminal 20 on the Z1 side to which the first metal layer 30 is exposed when the first metal layer 30 and the bus bar 101 are bonded to each other in the shaft portion 21. Thus, the interface I in the shaft portion 21 is separated by a large distance from a bond portion (weld portion W1) between the exposed first metal layer 30 and the bus bar 101, and hence heat resulting from bonding (welding) of the first metal layer 30 and the bus bar 101 can be inhibited from reaching the interface I. Consequently, generation of the fragile intermetallic compound in the interface I can be suppressed, and hence a reduction in the bonding strength between the first metal layer 30 and the second metal layer 40 can be suppressed.

According to the first embodiment, the first metal layer 30 is made of Al the same as the bus bar 101, and the second metal layer 40 is made of Cu the same as the negative-electrode collector 6. Thus, the bus bar 101, the negative-electrode terminal 20, and the negative-electrode collector 6 can be electrically connected to each other while the same are tightly bonded to each other by the same metals. Furthermore, Al and Cu each have relatively large ductility and are deformable, and the ductility of Al and the ductility of Cu are comparable with each other. Thus, the convex portion 32 can be more easily formed in the first metal layer 30 while fracture or the like is suppressed.

According to the first embodiment, in the shaft center A of the shaft portion 21, the convex portion 32 protrudes longer than the length (thickness t1) of the flange portion 22 in the direction Z to the Z2 side beyond the lower surface 22e of the flange portion 22 on the Z2 side. Thus, the convex portion 32 can be made large enough, and hence the area of the interface I between the first metal layer 30 and the second metal layer 40 can be increased.

According to the first embodiment, in the flange portion 22, the minimum thickness t2 of the first metal layer 30 in the direction Z is at least about 30% of the thickness t1 of the flange portion 22 in the direction Z. Thus, the first metal layer 30 can be sufficiently ensured in the direction Z in the flange portion 22, and hence the heat resulting from bonding (welding) of the first metal layer 30 and the bus bar 101 can be inhibited from reaching the interface I when the first metal layer 30 exposed to the Z1 side of the negative-electrode terminal 20 and the bus bar 101 are bonded to each other.

According to the first embodiment, in the shaft center A, the length L2 from the lower surface 22e of the flange portion 22 on the Z2 side to the end 32a of the convex portion 32 on the Z2 side is not more than 80% of the length L1 of the shaft portion 21 (negative-electrode terminal 20). Thus, the length of the second metal layer 40 along the direction Z can be easily ensured on the Z2 side of the shaft portion 21. Consequently, the length of the second metal layer 40 in the direction Z is ensured so that the second metal layer 40 and the negative-electrode collector 6 can be easily bonded to each other when the second metal layer 40 on the Z2 side of the shaft portion 21 and the negative-electrode collector 6 are bonded to each other.

According to the first embodiment, the length of the second metal layer 40 in the direction Z is ensured, whereby the interface I (the end 32a of the convex portion 32 on the Z2 side) between the first metal layer 30 and the second metal layer 40 can be separated by a large distance from the end 21b on the Z2 side to which the second metal layer 40 is exposed when the end 21b of the shaft portion 21 on the Z2 side and the negative-electrode collector 6 are bonded to each other. Thus, the interface I is separated by a large distance from a bond portion (weld portion W2) between the second metal layer 40 and the negative-electrode collector 6, and hence heat resulting from bonding (welding) of the weld portion W2 can be inhibited from reaching the interface I. Consequently, generation of the fragile intermetallic compound in the interface I can be suppressed, and hence a reduction in the bonding strength between the first metal layer 30 and the second metal layer 40 can be suppressed.

According to the first embodiment, both the first metal layer 30 and the second metal layer 40 are substantially axisymmetric with respect to the shaft center A, whereby the negative-electrode terminal 20 having a relatively simple shape can be easily formed.

According to the first embodiment, the negative-electrode terminal 20 in which the different metal layers (the first metal layer 30 and the second metal layer 40) are bonded to each other is provided, whereby the bus bar 101 that connects the lithium-ion batteries 1 to each other and the negative-electrode collector 6 of the lithium-ion battery 1 made of the metal different from the bus bar 101 can be easily bonded to each other.

A manufacturing process for the lithium-ion battery 1 and the assembled battery 100 according to the first embodiment of the present invention is now described with reference to FIGS. 1 to 7.

First, a rolled Al plate (not shown) having a prescribed thickness and a rolled Cu plate (not shown) having a prescribed thickness are prepared. The thickness of the Al plate and the thickness of the Cu plate are adjusted such that the ratio of the thicknesses is substantially equal to the ratio (t2:(t1−t2); see FIG. 5) of the thickness t2 of the first metal layer 30 to the thickness (t1−t2) of the second metal layer 40 in the flange portion 22 of the negative-electrode terminal 20 (see FIG. 4) at completion. For example, both the thickness of the Al plate and the thickness of the Cu plate are adjusted to about 4 mm. The width of the Al plate and the width of the Cu plate are made substantially the same.

Figure 6:
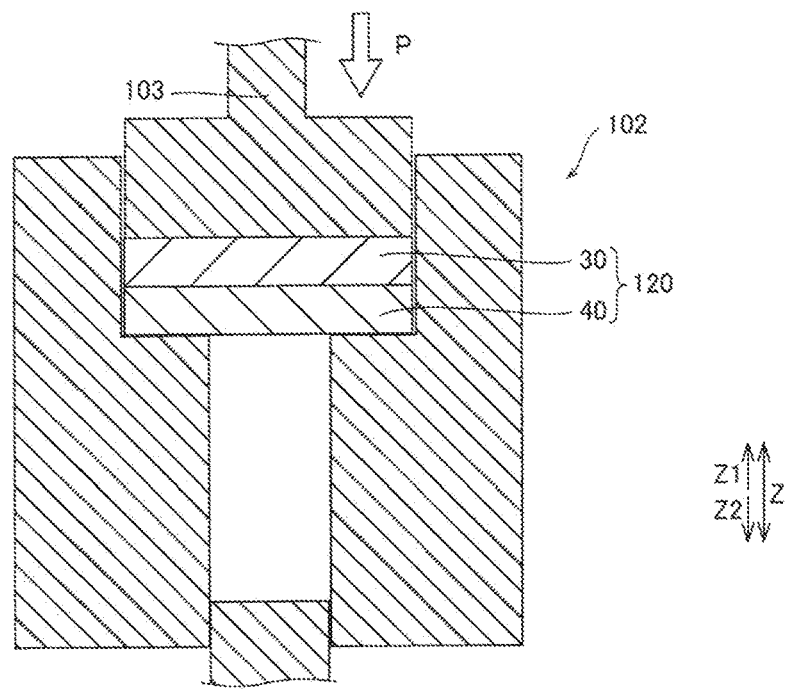
FIG. 6 is a perspective view for illustrating a method for manufacturing the negative-electrode terminal according to the first embodiment of the present invention.

While the rolled Cu plate is stacked on one entire surface of the rolled Al plate in the direction Z, the Al plate and the Cu plate are continuously pressure-bonded to each other with a prescribed rolling reduction (about 50%, for example). Then, the Al plate and the Cu plate bonded to each other are held for one minute under a temperature of about 500° C., whereby diffusion annealing is performed on the Al plate and the Cu plate bonded to each other. Thus, the rolled clad material having a thickness of about 4 mm is formed. Then, this clad material is punched into a disc shape having a diameter of about 10 mm, whereby a disc-shaped clad material 120 shown in FIG. 6 is formed. This disc-shaped clad material 120 is a so-called overlay clad material 120 in which the first metal layer 30 and the second metal layer 40 are bonded to each other in the direction Z in a state where the first metal layer 30 of Al is arranged on the first side (upper side; Z1 side) in the direction Z and the second metal layer 40 of Cu is arranged on the second side (lower side; Z2 side) in the direction Z.

Figure 7:
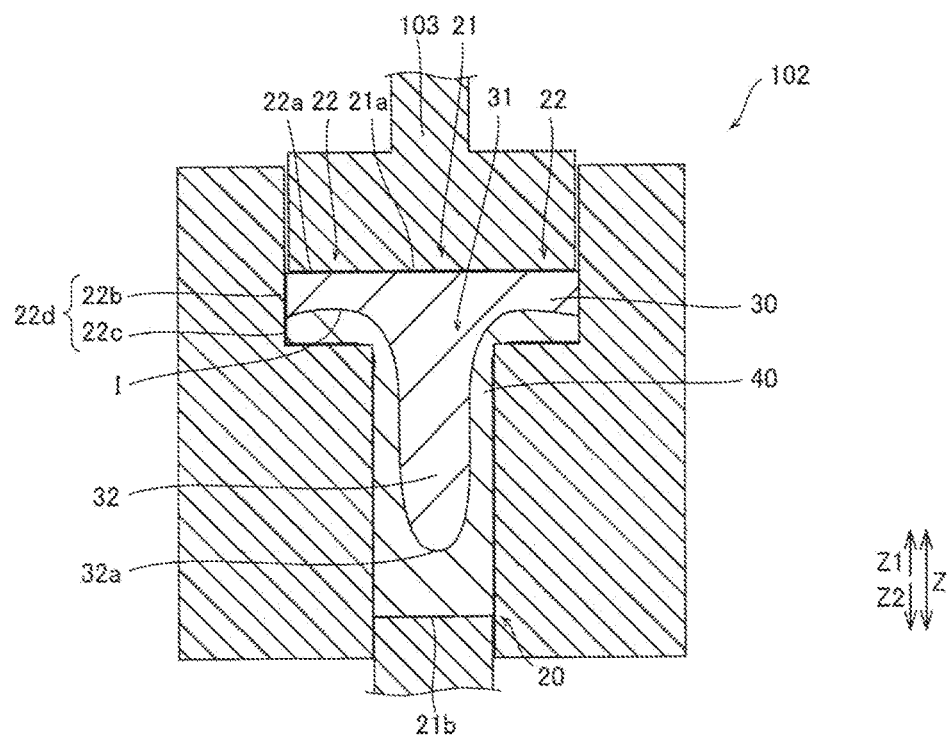
FIG. 7 is a perspective view for illustrating the method for manufacturing the negative-electrode terminal according to the first embodiment of the present invention.

In a manufacturing method according to the first embodiment, the overlay clad material 120 is arranged in a mold 102 corresponding to the shape of the negative-electrode terminal 20 (see FIG. 5), as shown in FIG. 6. Then, extrusion processing is performed on the overlay clad material 120 under ordinary temperature. Specifically, a servo press machine 103 capable of controlling press pressure or the like is employed to apply prescribed press pressure to the clad material 120 from the side of the first metal layer 30 (upper side; Z1 side) of the clad material 120. Thus, a central portion of the clad material 120 in the direction X and the direction Y is extruded toward a lower portion of the mold 102 corresponding to the shaft portion 21, as shown in FIG. 7.

Thus, the negative-electrode terminal 20 including the columnar shaft portion 21 and the annular flange portion 22 and having the T-shaped cross-section along the direction Z is formed, as shown in FIG. 5. The convex portion 32 that protrudes to the Z2 side is provided in the central portion 31 of the first metal layer 30 of the shaft portion 21. At this time, in the annular flange portion 22, the first metal layer 30 and the second metal layer 40 are bonded to each other in an entire region in which the first metal layer 30 and the second metal layer 40 face each other. In other words, overlay clad bonding is performed. This extrusion processing is performed a plurality of times, whereby the dimension accuracy of the outer shape of the negative-electrode terminal 20 may be improved.

Then, a laser light generator (not shown) is employed to bond the end 21b of the shaft portion 21 of the negative-electrode terminal 20 and the connecting portion 6a of the negative-electrode collector 6 to each other by laser welding in a state where the shaft portion 21 of the negative-electrode terminal 20 on the Z2 side beyond the flange portion 22 is inserted into the insertion hole 7b of the packing 7, the insertion hole 2b of the cover member 2 and the insertion hole 8b of the packing 8, as shown in FIG. 4. In this case, laser light is emitted (scanned) to along the circumference of the columnar shaft portion 21. Thus, the negative-electrode terminal 20 and the negative-electrode collector 6 are bonded (welded) to each other. In this case, both the second metal layer 40 and the negative-electrode collector 6 located in the weld portion W2 of the shaft portion 21 of the negative-electrode terminal 20 are made of Cu, whereby the second metal layer 40 and the negative-electrode collector 6 are tightly bonded (welded) to each other. Furthermore, the interface I is separated by a large distance from the bond portion (weld portion W2) between the second metal layer 40 and the negative-electrode collector 6, and hence the heat resulting from bonding (welding) of the weld portion W2 is inhibited from reaching the interface I.

Similarly, the laser light generator is employed to bond the shaft portion 11 of the positive-electrode terminal 10 and the connecting portion 5a of the positive-electrode collector 5 to each other by laser welding in a state where a portion of the shaft portion 11 of the positive-electrode terminal 10 that further protrudes to the Z2 side with respect to the flange portion 12 is inserted into the insertion hole 7a of the packing 7, the insertion hole 2a of the cover member 2 and the insertion hole 8a of the packing 8, as shown in FIG. 3. In this case, both the positive-electrode terminal 10 and the positive-electrode collector 5 are made of Al, whereby the positive-electrode terminal 10 and the positive-electrode collector 5 are tightly bonded (welded) to each other. Then, the battery case body 3 and the cover member 2 are welded to each other. Thus, the lithium-ion battery 1 is manufactured, as shown in FIG. 2.

Then, the plurality of lithium-ion batteries 1 are arranged along the direction X, as shown in FIG. 1. Then, the positive-electrode terminal 10 of the lithium-ion battery 1 and the negative-electrode terminal 20 of the lithium-ion battery 1 adjacent thereto are bonded to each other by the flat plate-shaped bus bar 101. Specifically, the laser light generator adjusted to prescribed strength and a prescribed emission time is employed to bond the negative-electrode terminal 20 and the bus bar 101 to each other by laser welding in a state where the lower surface of the flat plate-shaped bus bar 101 is brought into contact with the upper surface 21a of the shaft portion 21 and the upper surface 22a of the flange portion 22 in the negative-electrode terminal 20, as shown in FIG. 4. At this time, the welding is performed so that the weld portion W1 is formed in the shaft portion 21. Thus, the negative-electrode terminal 20 and the bus bar 101 are bonded (welded) to each other. In this case, both the first metal layer 30 and the bus bar 101 located in the weld portion W1 of the negative-electrode terminal 20 are made of Al, whereby the first metal layer 30 and the bus bar 101 are tightly bonded (welded) to each other. Furthermore, the interface I is separated by a large distance from the bond portion (weld portion W1) between the first metal layer 30 and the bus bar 101, and hence the heat resulting from bonding (welding) of the weld portion W1 is inhibited from reaching the interface I.

The laser light generator is also employed to bond the positive-electrode terminal 10 and the bus bar 101 to each other by laser welding in a state where the lower surface of the flat plate-shaped bus bar 101 is brought into contact with the upper surface of the positive-electrode terminal 10, as shown in FIG. 1. Thus, the positive-electrode terminal 10 and the bus bar 101 are bonded (welded) to each other. In this case, both the positive-electrode terminal 10 and the bus bar 101 are made of Al, whereby the positive-electrode terminal 10 and the bus bar 101 are tightly bonded (welded) to each other. Consequently, the assembled battery 100 in which the plurality of lithium-ion batteries 1 are connected in series to each other by the plurality of bus bars 101 of Al is manufactured.

In the manufacturing method according to the first embodiment, the following effects can be obtained.

In the manufacturing method according to the first embodiment, as hereinabove described, the extrusion processing involving simple positioning is performed on the overlay clad material 120, whereby the negative-electrode terminal 20 in which the convex portion 32 is formed in the central portion 31 of the first metal layer 30 of the shaft portion 21 can be easily prepared. Thus, the number of extrusion processing steps required to prepare the negative-electrode terminal 20 is reduced so that a tact time can be reduced, and the yield of the negative-electrode terminal 20 can be improved.

Second Embodiment

A second embodiment of the present invention is now described with reference to FIGS. 8 and 9. According to this second embodiment, in addition to the aforementioned structures according to the first embodiment, a bottomed hole 221c is provided in a negative-electrode terminal 220. The negative-electrode terminal 220 is an example of the "battery terminal" in the present invention.

Figure 8:
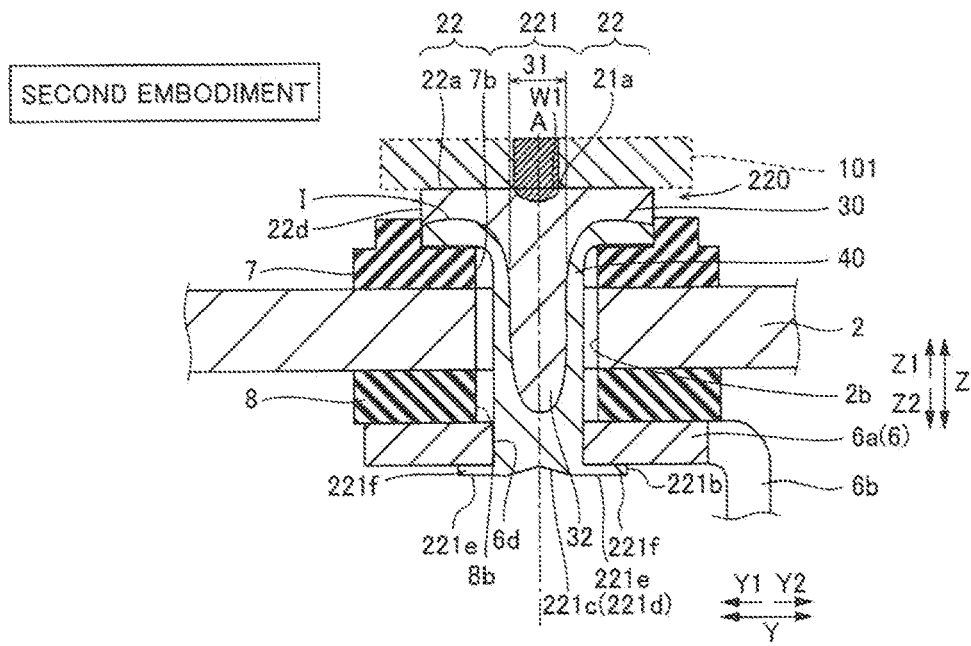
FIG. 8 is a sectional view showing a region around a negative-electrode terminal according to a second embodiment of the present invention.
Figure 9:
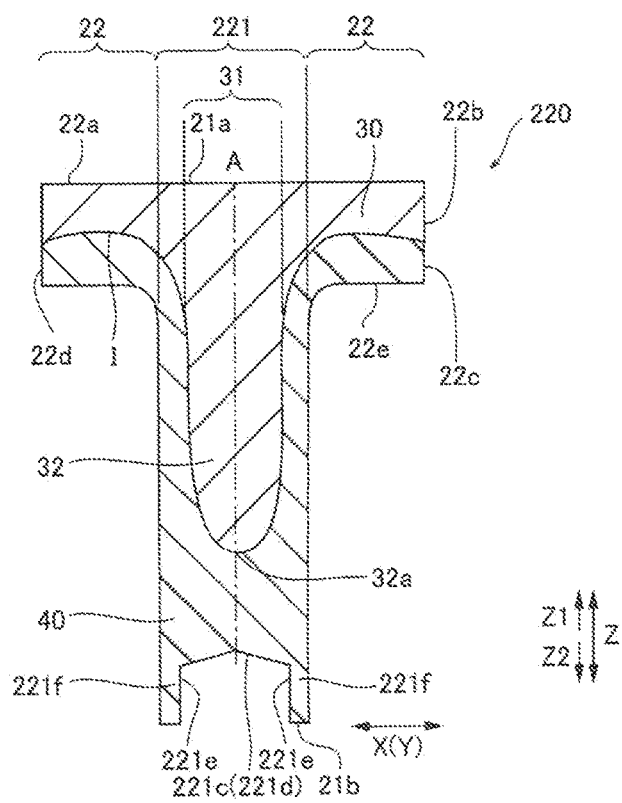
FIG. 9 is a sectional view showing the negative-electrode terminal according to the second embodiment of the present invention.

According to the second embodiment of the present invention, the negative-electrode terminal 220 includes a columnar shaft portion 221 and an annular flange portion 22, as shown in FIGS. 8 and 9. Consequently, the negative-electrode terminal 220 is rivet-shaped and has a T-shaped cross-section along a direction Z, similarly to the negative-electrode terminal 20 according to the aforementioned first embodiment. The negative-electrode terminal 220 is made of a clad material in which a first metal layer 30 of Al and a second metal layer 40 of Cu are bonded to each other by rolling. A convex portion 32 that protrudes to a Z2 side in the direction Z (shaft direction) is provided in a central portion 31 of the shaft portion 221 of the first metal layer 30.

According to the second embodiment, the bottomed hole 221c obtained by partially notching the second metal layer 40 while leaving a peripheral edge of the second metal layer 40 is formed in a lower portion of the shaft portion 221 on the side (lower side) of the shaft portion 221 closer to an end (top surface) 21b, as shown in FIG. 9. In other words, both a bottom surface 221d inclined to a Z1 side toward a shaft center A and an inner side surface 221e that extends from the bottom surface 221*d* to the Z2 side include the second metal layer 40 in the bottomed hole 221*c*. A wall portion 221*f* provided with the inner side surface 221*e* of the bottomed hole 221*c* is bent outward from the side of the shaft center A of the shaft portion 221 so as to come into contact with the lower surface of a connecting portion 6*a* of a negative-electrode collector 6, whereby the wall portion 221*f* is swaged onto the connecting portion 6*a* of the negative-electrode collector 6 in a state where the inner side surface 221*e* of the bottomed hole 221*c* is exposed to the Z2 side, as shown in FIG. 8.

The bent wall portion 221*f* and the connecting portion 6*a* of the negative-electrode collector 6 may be welded to each other by laser welding in a state where the wall portion 221*f* is swaged or may not be welded to each other. Thus, in the case where the wall portion 221*f* and the negative-electrode collector 6 are welded to each other, the negative-electrode terminal 220 and the connecting portion 6*a* of the negative-electrode collector 6 can be more reliably bonded to each other. In the case where the wall portion 221*f* and the negative-electrode collector 6 are not welded to each other, a welding step can be removed, and hence a manufacturing process for a battery (lithium-ion battery) employing the negative-electrode terminal 220 can be simplified. As shown in FIG. 9, in order to prevent the convex portion 32 of the first metal layer 30 from being exposed to an external portion by notching, the bottomed hole 221*c* is formed such that the bottom surface 221*d* is located on the Z2 side beyond an end 32*a* of the convex portion 32.

The remaining structures of the second embodiment are similar to those of the aforementioned first embodiment.

According to the second embodiment, the following effects can be obtained.

According to the second embodiment, the negative-electrode terminal 220 is made of the clad material, and a protruding portion (convex portion 32) that further protrudes to the Z2 side in the direction Z (shaft direction) with respect to a surface (interface I) of the first metal layer 30 on the Z2 side in the flange portion 22 is provided in the first metal layer 30 of the shaft portion 221, similarly to the aforementioned first embodiment, whereby bonding strength between the first metal layer 30 and the second metal layer 40 can be increased. Furthermore, the Z1 sides of the shaft portion 221 and the flange portion 22 include the first metal layer 30, and the Z2 sides of the shaft portion 221 and the flange portion 22 include the second metal layer 40. Thus, a bus bar 101 and the negative-electrode collector 6 can be easily electrically connected to each other through the negative-electrode terminal 220.

According to the second embodiment, the bottomed hole 221*c* in which the bottom surface 221*d* and the inner side surface 221*e* include the second metal layer 40 is formed in the end 21*b* of the shaft portion 221 on the Z2 side, whereby the second metal layer 40 (the wall portion 221*f* provided with the inner side surface 221*e*) around the bottomed hole 221*c* can be deformed to be swaged, and hence the negative-electrode terminal 220 and the negative-electrode collector 6 can be easily fixed to each other. The remaining effects of the second embodiment are similar to those of the aforementioned first embodiment.

Third Embodiment

A third embodiment of the present invention is now described with reference to FIG. 10. In a negative-electrode terminal 320 according to the third embodiment, a reaction suppression layer 350 is arranged between a first metal layer 30 and a second metal layer 40 in addition to the aforementioned structures according to the first embodiment. The negative-electrode terminal 320 is an example of the "battery terminal" in the present invention.

Figure 10:
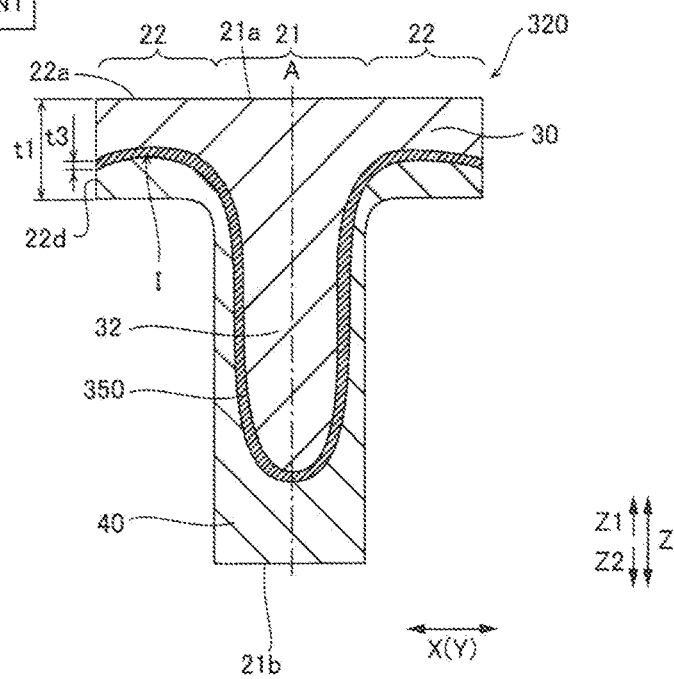
FIG. 10 is a sectional view showing a negative-electrode terminal according to a third embodiment of the present invention.

The negative-electrode terminal 320 according to the third embodiment of the present invention includes a columnar shaft portion 21 and an annular flange portion 22 and has a T-shaped cross-section along a direction Z, as shown in FIG. 10. The negative-electrode terminal 320 is made of a clad material in which the first metal layer 30 of Al, the second metal layer 40 of Cu, and the reaction suppression layer 350 of Ni are bonded to each other by rolling. A convex portion 32 that protrudes to a Z2 side in the direction Z (shaft direction) is provided in a central portion 31 of the shaft portion 21 of the first metal layer 30.

The reaction suppression layer 350 is arranged (bonded) between the first metal layer 30 and the second metal layer 40. The reaction suppression layer 350 has a function of suppressing generation of a fragile Al—Cu alloy on an interface I between the first metal layer 30 and the second metal layer 40 resulting from reaction of the aluminum of which the first metal layer 30 is made and the copper of which the second metal layer 40 is made. The reaction suppression layer 350 is formed over the substantially entire interface I between the first metal layer 30 and the second metal layer 40.

The reaction suppression layer 350 is made of Ni, which is more expensive than Al and Cu. Therefore, the thickness t3 of the reaction suppression layer 350 is preferably small in terms of material costs, and specifically, the thickness t3 of the reaction suppression layer 350 is preferably not more than about 10% of the thickness t1 of the flange portion 22 in the direction Z. Ni has slightly smaller ductility than that of Al and Cu, and hence the reaction suppression layer 350 is easily fractured. Even if the reaction suppression layer 350 partially fractures, however, an advantage of providing the reaction suppression layer 350 is not seriously compromised. A region other than a fractured portion can produce a function effect of reducing the possibility of generation of the fragile Al—Cu alloy on the interface I between the first metal layer 30 and the second metal layer 40 and the possibility of corrosion resulting from contact with a dissimilar metal (bimetallic corrosion), for example.

A method for manufacturing the negative-electrode terminal 320 according to the third embodiment is similar to that according to the aforementioned first embodiment except that the clad material in which the first metal layer 30 of Al, the reaction suppression layer 350 of Ni, and the second metal layer 40 of Cu are bonded to each other in a state where the first metal layer 30, the reaction suppression layer 350, and the second metal layer 40 are stacked in this order from the Z1 side is formed by continuously pressure-bonding an Al plate, a Ni plate, and a Cu plate to each other.

According to the third embodiment, the following effects can be obtained.

According to the third embodiment, the negative-electrode terminal 320 is made of the clad material, and a protruding portion (convex portion 32) that further protrudes to the Z2 side in the direction Z (shaft direction) with respect to a surface (interface I) of the first metal layer 30 on the Z2 side in the flange portion 22 is provided in the first metal layer 30 of the shaft portion 21, similarly to the aforementioned first embodiment, whereby bonding strength between the first metal layer 30 and the second metal layer 40 can be increased. Furthermore, the Z1 sides of the shaft portion 21 and the flange portion 22 include the first metal layer 30, and the Z2 sides of the shaft portion 21 and the flange portion 22 include the second metal layer 40. Thus, a bus bar and a negative-electrode collector can be easily electrically connected to each other through the negative-electrode terminal 320.

According to the third embodiment, the negative-electrode terminal 320 includes the reaction suppression layer 350 arranged (bonded) between the first metal layer 30 and the second metal layer 40 and configured to suppress the reaction of the metal of which the first metal layer 30 is made and the metal of which the second metal layer 40 is made. Thus, the reaction suppression layer 350 can reliably suppress generation of a fragile intermetallic compound (Al—Cu alloy) caused by the reaction of the aluminum of which the first metal layer 30 is made and the copper of which the second metal layer 40 is made, and hence a reduction in the bonding strength between the first metal layer 30 and the second metal layer 40 resulting from the intermetallic compound can be reliably suppressed. Furthermore, the reaction suppression layer 350 can suppress bimetallic corrosion. The remaining effects of the third embodiment are similar to those of the aforementioned first embodiment.

Fourth Embodiment

A fourth embodiment of the present invention is now described with reference to FIG. 11. In this fourth embodiment, an outside portion 433 outside a central portion 431 further protrudes to a Z2 side with respect to the central portion 431 in a protruding portion 432 of a first metal layer 30, unlike the aforementioned first embodiment.

Figure 11:
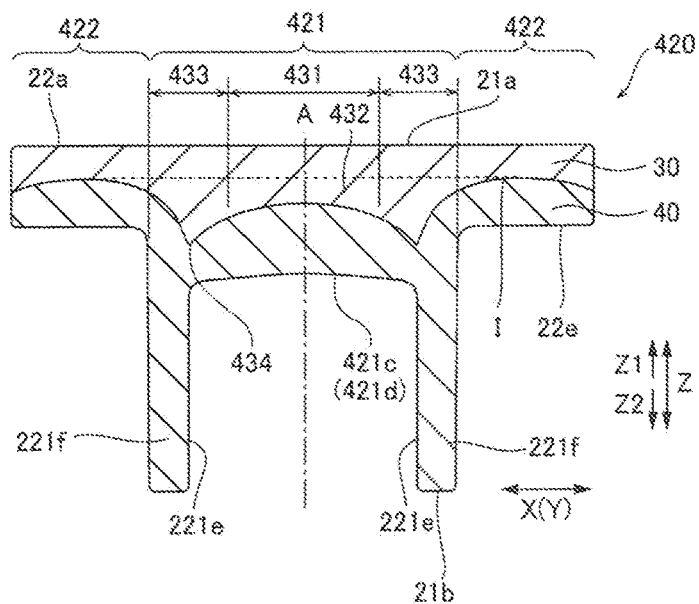
FIG. 11 is a sectional view showing a negative-electrode terminal according to a fourth embodiment of the present invention.

According to the fourth embodiment of the present invention, a negative-electrode terminal 420 includes a columnar shaft portion 421 and an annular flange portion 422, as shown in FIG. 11. Consequently, the negative-electrode terminal 420 is rivet-shaped. The negative-electrode terminal 420 is made of a clad material in which the first metal layer 30 of Al and a second metal layer 40 of Cu are bonded to each other by rolling. The negative-electrode terminal 420 is an example of the "battery terminal" in the present invention.

According to the fourth embodiment, the protruding portion 432 that protrudes to the Z2 side in a direction Z (shaft direction) is provided in the first metal layer 30. This protruding portion 432 is continuously provided on the entire shaft portion 421 and a portion of the flange portion 422 closer to the shaft portion 421 (shaft center A). The protruding portion 432 of the first metal layer 30 in the shaft portion 421 further protrudes to the Z2 side with respect to a surface (interface I) of the first metal layer 30 on the Z2 side in the flange portion 422.

In the protruding portion 432 of the shaft portion 421, the outside portion 433 outside the central portion 431 (closer to the flange portion 422) further protrudes to the Z2 side with respect to the central portion 431. Consequently, a top 434 of the protruding portion 432 on the Z2 side is formed in the outside portion 433. The top 434 is tapered toward the Z2 side. Specifically, the top 434 is pointed toward the Z2 side.

The top 434 of the outside portion 433 annularly protrudes to the Z2 side so as to surround the central portion 431. Consequently, a pair of tops 434 are provided in the outside portion 433 on the cross-section of the negative-electrode terminal 420 shown in FIG. 11. Therefore, the annular top 434 can act as an obstacle and prevent the interface I between the first metal layer 30 and the second metal layer 40 from sliding (deviating) in an X-Y planar direction by application of force in the X-Y planar direction orthogonal to the direction Z to either the first metal layer 30 or the second metal layer 40. Thus, sliding of the interface I in the X-Y planar direction is suppressed.

A bottomed hole 421c obtained by partially notching the second metal layer 40 while leaving a peripheral edge of the second metal layer 40 is formed in a lower portion of the shaft portion 421 on the side of the shaft portion 421 closer to an end 21b. The bottom surface 421d of the bottomed hole 421c is located on the Z2 side beyond the lower surface 22e of the flange portion 422 on the Z2 side in the vicinity of the lower surface 22e.

In the negative-electrode terminal 420, both the first metal layer 30 and the second metal layer 40 are substantially axisymmetric with respect to the shaft center A.

The remaining structures of the fourth embodiment are similar to those of the aforementioned first and second embodiments.

According to the fourth embodiment, the following effects can be obtained.

According to the fourth embodiment, the negative-electrode terminal 420 is made of the clad material, and the protruding portion 432 that protrudes to the Z2 side in the direction Z (shaft direction) is provided in the first metal layer 30 of the shaft portion 421, similarly to the aforementioned first embodiment, whereby bonding strength between the first metal layer 30 and the second metal layer 40 can be increased. Furthermore, the Z1 sides of the shaft portion 421 and the flange portion 422 include the first metal layer 30, and the Z2 sides of the shaft portion 421 and the flange portion 422 include the second metal layer 40. Thus, a bus bar and a negative-electrode collector can be easily electrically connected to each other through the negative-electrode terminal 420.

According to the fourth embodiment, in the protruding portion 432 of the first metal layer 30, the outside portion 433 outside the central portion 431 (closer to the flange portion 422) further protrudes to the Z2 side with respect to the central portion 431. Thus, the bonding strength between the first metal layer 30 and the second metal layer 40 in a position where the outside portion 433 is formed can be effectively increased.

According to the fourth embodiment, the top 434 of the outside portion 433 annularly protrudes to the Z2 side, whereby the top 434 of the outside portion 433 that annularly protrudes can effectively suppress sliding of the interface I between the first metal layer 30 and the second metal layer 40 in the X-Y planar direction.

According to the fourth embodiment, the top 434 of the outside portion 433 annularly protrudes so as to be tapered toward the Z2 side, whereby both improvement of the bonding strength and suppression of the sliding can be easily ensured without complicating the shape of the top 434. The remaining effects of the fourth embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the first metal layer 30 is made of Al and the second metal layer 40 is made of Cu in each of the aforementioned first to fourth embodiments, the present invention is not restricted to this. According to the present invention, an Al alloy may alternatively be employed instead of Al, and a Cu alloy may alternatively be employed instead of Cu. The Al alloy includes an Al—Mn based alloy in No.

A3000s of JIS etc., for example. The Cu alloy includes a Cu—Fe based alloy, which is C194, etc., for example.

While the first metal layer 30 and the bus bar 101 bonded to each other are made of the same metal (Al) and the second metal layer 40 and the negative-electrode collector 6 bonded to each other are made of the same metal (Cu) in each of the aforementioned first to fourth embodiments, the present invention is not restricted to this. According to the present invention, the first metal layer and the bus bar bonded to each other may alternatively be made of not the same metal but the same type of metal, as in the case where one of the first metal layer and the bus bar is made of Al and the other of the first metal layer and the bus bar is made of an Al alloy, for example. Similarly, the second metal layer and the negative-electrode collector bonded to each other may alternatively be made of not the same metal but the same type of metal, as in the case where one of the second metal layer and the negative-electrode collector is made of Cu and the other of the second metal layer and the negative-electrode collector is made of a Cu alloy, for example. The term "same type of metal" according to the present invention indicates a wide concept including not only metals (pure metal and an alloy) containing the same chemical component but also metals containing the same main metal element even containing the different chemical components.

While the negative-electrode terminal 20 (220, 320, 420) made of the clad material including the first metal layer 30 of Al and the second metal layer 40 of Cu is employed as the "battery terminal" according to the present invention, the first metal layer 30 and the bus bar 101 both made of Al are connected to each other, and the second metal layer 40 and the negative-electrode collector 6 both made of Cu are connected to each other in each of the aforementioned first to fourth embodiments, the present invention is not restricted to this. According to the present invention, a positive-electrode terminal made of a clad material including a first metal layer of Cu and a second metal layer of Al may alternatively be employed as the "battery terminal" according to the present invention, the first metal layer and a bus bar both made of Cu may alternatively be connected to each other, and the second metal layer and a positive-electrode collector both made of Al may alternatively be connected to each other. In this case, in each of the aforementioned first to fourth embodiments, Cu and Al become inverted. Furthermore, in this case, the bus bar of Cu having small electric resistance can be employed, and hence power consumption in the bus bar can be reduced. Consequently, electric loss in the assembled battery can be reduced.

While the first metal layer 30 and the second metal layer 40 are made of Al and Cu, respectively, in each of the aforementioned first to fourth embodiments, the present invention is not restricted to this. According to the present invention, a combination of Al (Al alloy) and Fe (Fe alloy), a combination of Al (Al alloy) and Ni (Ni alloy), a combination of Cu (Cu alloy) and Fe (Fe alloy), and a combination of Cu (Cu alloy) and Ni (Ni alloy) may alternatively be employed as a combination of the first metal layer and the second metal layer, for example.

Figure 12:
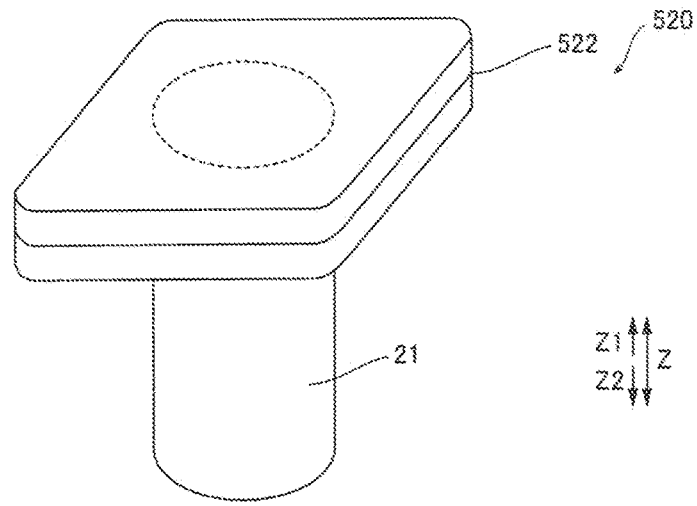
FIG. 12 is a perspective view showing a negative-electrode terminal according to a modification of the first embodiment of the present invention.

While the negative-electrode terminal 20 (220, 320, 420) includes the columnar shaft portion 21 (221) and the annular flange portion 22 in each of the aforementioned first to fourth embodiments, the present invention is not restricted to this. According to the present invention, a negative-electrode terminal 520 may alternatively include a columnar shaft portion 21 and a rectangular frame-shaped flange portion 522 that radially expands in a radiation direction (a direction orthogonal to a direction Z) from the shaft portion 21, as in a modification of the first embodiment shown in FIG. 12. Even this negative-electrode terminal 520 has a cross-section along the direction Z identical to that shown in FIG. 5. The negative-electrode terminal 520 is an example of the "battery terminal" in the present invention. Furthermore, the shaft portion of the negative-electrode terminal may alternatively be prism-shaped.

Figure 13:
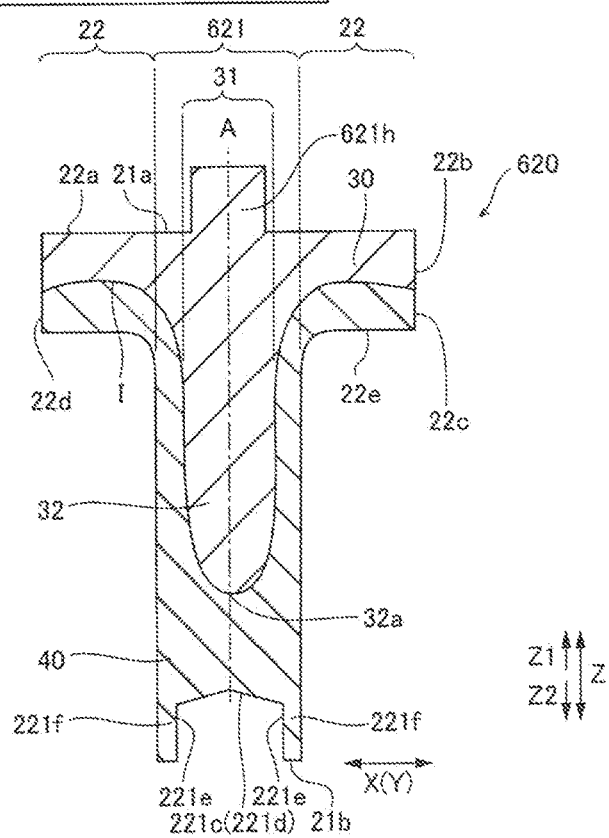
FIG. 13 is a sectional view showing a negative-electrode terminal according to a modification of the second embodiment of the present invention.

While the negative-electrode terminal 20 (220, 320) is T-shaped in each of the aforementioned first to fourth embodiments, the present invention is not restricted to this. According to the present invention, a negative-electrode terminal 620 may alternatively be cross-shaped, as in a modification of the second embodiment shown in FIG. 13. Specifically, a shaft portion 621 of the negative-electrode terminal 620 is formed with a projecting portion 621h that projects from an upper surface 21a toward a Z1 side. This projecting portion 621h is formed by projecting a first metal layer 30 of the shaft portion 621 toward the Z1 side. Consequently, the negative-electrode terminal 620 is formed in a cross shape by a flange portion 22 and the shaft portion 621 that extends from the flange portion 22 to both the Z1 side and a Z2 side. The negative-electrode terminal 620 is an example of the "battery terminal" in the present invention.

The projecting portion 621h of the shaft portion 621 according to the modification of the second embodiment may alternatively be applied to the structure according to the first embodiment. In other words, only the projecting portion 621h may be provided in the shaft portion 621 according to the modification of the second embodiment without providing a bottomed hole 221c. Furthermore, a bottomed hole may alternatively be provided in the projecting portion 621h of the shaft portion 621 according to the modification of the second embodiment. In other words, both the bottomed hole 221c and the bottomed hole of the projecting portion 621h in which the bottom surface and the inner side surface include the first metal layer 30 may be formed in the shaft portion 621. In this case, a wall portion of the bottomed hole including the first metal layer 30 can be swaged onto an unshown bus bar, similarly to the bottomed hole 221c, and hence the negative-electrode terminal and the bus bar can be easily fixed to each other.

While the convex portion 32 of the first metal layer 30 further protrudes to the Z2 side with respect to the lower surface 22e of the flange portion 22 on the Z2 side in the shaft center A of the shaft portion 21 in each of the aforementioned first to third embodiments, the present invention is not restricted to this. According to the present invention, the convex portion of the first metal layer may not further protrude downward with respect to the lower surface of the flange portion in the shaft center of the shaft portion.

While the negative-electrode terminal 20 (320) and the bus bar 101 are bonded (welded) to each other by laser welding and the negative-electrode terminal 20 (320) and the negative-electrode collector 6 are bonded (welded) to each other by laser welding in each of the aforementioned first and third embodiments, and the negative-electrode terminal 220 and the bus bar 101 are bonded (welded) to each other by laser welding in the aforementioned second embodiment, the present invention is not restricted to this. According to the present invention, the negative-electrode terminal and the bus bar or the negative-electrode collector may alternatively be bonded to each other by another welding method such as resistance welding, TIG (tungsten inert gas) welding, or ultrasonic welding according to the positional relationship between the negative-electrode terminal and the bus bar or the negative-electrode collector, for example. Laser welding can be used so far as a weld position is a position to which a laser can be emitted and enables easy welding, and hence it is preferable, as compared with resistance welding or the like requiring a welding terminal to be arranged in the vicinity of the weld position.

While the convex portion 32 (protruding portion 432) is formed in the first metal layer 30 by the extrusion processing in each of the aforementioned first to fourth embodiments, the present invention is not restricted to this. According to the present invention, the convex portion or the protruding portion may alternatively be formed in the first metal layer by a processing method other than the extrusion processing.

While the reaction suppression layer 350 is made of Ni in the aforementioned third embodiment, the present invention is not restricted to this. According to the present invention, the reaction suppression layer may alternatively be made of a Ni alloy or another material.

While the negative-electrode terminal 20 (220) is made of the two-layered clad material in each of the aforementioned first, second, and fourth embodiments, and the negative-electrode terminal 320 is made of the three-layered clad material in the aforementioned third embodiment, the present invention is not restricted to this. According to the present invention, the battery terminal may alternatively be made of a four or more-layered clad material.

While the flange portion 22 of the negative-electrode terminal 20 (220, 320) is arranged outside the lithium-ion battery 1 (above the cover member 2) and the portion that further protrudes downward (to the Z2 side) with respect to the flange portion 22 of the shaft portion 21 (221) is arranged inside the lithium-ion battery 1 (battery case body 3) in each of the aforementioned first to fourth embodiments, the present invention is not restricted to this. According to the present invention, the flange portion of the negative-electrode terminal may alternatively be arranged inside the lithium-ion battery, and a portion that further protrudes upward with respect to the flange portion of the shaft portion may alternatively be arranged outside the lithium-ion battery. In this case, the first metal layer of the negative-electrode terminal on the first side in the shaft direction is made of the same type of metal (Cu) as the negative-electrode collector, and the second metal layer of the negative-electrode terminal on the second side in the shaft direction is made of the same type of metal (Al) as the bus bar.

While the protruding portion (the convex portion 32 and the protruding portion 432) of the first metal layer 30 that protrudes to the Z2 side is provided at least in the central portion 31 (431) of the shaft portion 21 (221) in each of the aforementioned first to fourth embodiments, the present invention is not restricted to this. According to the present invention, the protruding portion of the first metal layer in the shaft portion that protrudes to the second side in the shaft direction may alternatively be provided only in an outside portion outside the central portion (closer to the flange portion) of the shaft portion not in the central portion. In other words, in the aforementioned fourth embodiment, the negative-electrode terminal may be configured such that the first metal layer in the outside portion outside the central portion (closer to the flange portion) of the shaft portion further protrudes to the second side in the shaft direction with respect to the first metal layer in the flange portion while the first metal layer in the central portion of the shaft portion does not further protrude to the second side in the shaft direction with respect to the first metal layer in the flange portion.

While the negative-electrode terminal 220 and the connecting portion 6a of the negative-electrode collector 6 are bonded to each other by deforming and swaging the wall portion 221f of the bottomed hole 221c provided with the inner side surface 221e in the aforementioned second embodiment, the present invention is not restricted to this. According to the present invention, the negative-electrode terminal and the negative-electrode collector may alternatively be bonded (fixed) to each other by welding in a state where the negative-electrode collector is inserted into the bottomed hole, for example. Thus, the negative-electrode terminal and the negative-electrode collector can be easily fixed to each other.

What is claimed is:

1. A battery terminal comprising a shaft portion and a flange portion that radially expands in a radiation direction from the shaft portion,
   the battery terminal made by performing extrusion processing on a clad material in which at least a first metal layer and a second metal layer are bonded to each other, wherein
   each of the shaft portion and the flange portion includes the first metal layer and the second metal layer, and
   the first metal layer includes a protruding portion in the shaft portion that protrudes toward the second metal layer in the shaft direction.

2. The battery terminal according to claim 1, wherein
   at least in a central portion of the shaft portion, the protruding portion of the first metal layer protrudes toward the second metal layer.

3. The battery terminal according to claim 2, wherein
   in the central portion of the shaft portion, the protruding portion of the first metal layer includes a convex portion that has a convex shape at an end of the protruding portion.

4. The battery terminal according to claim 3, wherein
   in a shaft center of the shaft portion, the convex portion protrudes to the second metal layer side.

5. The battery terminal according to claim 4, wherein
   in the shaft center, the convex portion protrudes longer than a length of the flange portion in the shaft direction toward the second metal layer.

6. The battery terminal according to claim 1, wherein
   one of the first metal layer and the second metal layer is made of Al or an Al alloy, and
   the other of the first metal layer and the second metal layer is made of Cu or a Cu alloy.

7. The battery terminal according to claim 1, wherein
   in the shaft direction, a minimum length of the first metal layer of the flange portion is at least 30% of a length of the flange portion.

8. The battery terminal according to claim 3, wherein
   in a shaft center of the shaft portion, the convex portion does not protrude beyond 80% of a length of the shaft portion from the flange portion.

9. The battery terminal according to claim 1, wherein
   the shaft portion includes the second metal layer having a concave shape with a bottom surface and an inner side surface.

10. The battery terminal according to claim 1, wherein
    both the first metal layer and the second metal layer are substantially axisymmetric with respect to a shaft center of the shaft portion.

11. The battery terminal according to claim 1, further comprising a reaction suppression layer configured to suppress reaction of metal of which the first metal layer is made and metal of which the second metal layer is made.

12. The battery terminal according to claim 2, wherein the protruding portion of the first metal layer includes a portion that protrudes toward the second metal layer outside a shaft center.

13. The battery terminal according to claim 12, wherein the portion annularly protrudes toward the second metal layer out outside the shaft center.

14. The battery terminal according to claim 13, wherein the protruding portion annularly protrudes outside the shaft center so as to be tapered toward the second metal layer.

15. A method for manufacturing a battery terminal, comprising:
forming an overlay clad material by bonding at least a first metal layer and a second metal layer to each other; and
forming a battery terminal including a shaft portion and a flange portion that radially expands in a radiation direction from the shaft portion by performing extrusion processing on the overlay clad material, wherein
each of the shaft portion and the flange portion includes the first metal layer and the second metal layer, and
the first metal layer in the shaft portion includes a protruding portion that protrudes toward the second metal layer in the shaft direction.

16. The method for manufacturing a battery terminal according to claim 15, wherein
forming the overlay clad material includes bonding a reaction suppression layer configured to suppress reaction of metal of which the first metal layer is made and metal of which the second metal layer is made between the first metal layer and the second metal layer.

17. A battery comprising a battery terminal including a shaft portion and a flange portion that radially expands in a radiation direction from the shaft portion, wherein
the battery terminal is made of by performing extrusion processing on a clad material in which at least a first metal layer and a second metal layer are bonded to each other,
each of the shaft portion and the flange portion includes the first metal layer and the second metal layer, and
the first metal layer in the shaft portion includes a protruding portion protruding toward the second metal layer in the shaft direction.

18. The battery according to claim 17, wherein
at least in a central portion of the shaft portion, the protruding portion of the first metal layer of the battery terminal protrudes toward the second metal layer with respect to a surface of the first metal layer in the flange portion.

19. The battery according to claim 18, wherein
in the central portion of the shaft portion, the protruding portion of the first metal layer of the battery terminal includes a convex portion that protrudes in a convex shape.

20. The battery according to claim 17, wherein
the first metal layer of the battery terminal is connected to one of a connecting member and a collector made of the same type of metal as the first metal layer, and
the second metal layer of the battery terminal is connected to the other of the connecting member and the collector made of the same type of metal as the second metal layer.

* * * * *